US011379796B2

(12) United States Patent
Balestrazzi et al.

(10) Patent No.: US 11,379,796 B2
(45) Date of Patent: *Jul. 5, 2022

(54) MANAGING PROJECT RESOURCES

(71) Applicant: International Business Machines Corporation, Armonk, NY (US)

(72) Inventors: Luca Balestrazzi, Rome (IT); Fabio De Angelis, Albano Laziale (IT); Andrea Napoleoni, Arsoli (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 505 days.

This patent is subject to a terminal disclaimer.

(21) Appl. No.: 15/815,782

(22) Filed: Nov. 17, 2017

(65) Prior Publication Data

US 2018/0336522 A1 Nov. 22, 2018

Related U.S. Application Data

(63) Continuation of application No. 15/597,614, filed on May 17, 2017, now Pat. No. 11,227,258.

(51) Int. Cl.
*G06F 16/30* (2019.01)
*G06Q 10/10* (2012.01)
(Continued)

(52) U.S. Cl.
CPC ......... *G06Q 10/103* (2013.01); *G06F 16/219* (2019.01); *G06F 16/2358* (2019.01)

(58) Field of Classification Search
CPC .......... G06F 16/06359; G06F 16/2358; G06F 16/219
(Continued)

(56) References Cited

U.S. PATENT DOCUMENTS

| 5,548,506 | A | 8/1996 | Srinivasan | |
|---|---|---|---|---|
| 6,601,233 | B1 * | 7/2003 | Underwood | ............... G06F 8/24 717/102 |

(Continued)

OTHER PUBLICATIONS

"Project Server 2016: A highly scaleable and flexible on-premises solution for PPM", copyright 2016-2017, Microsoft, 14 pages. https://products.office.com/en-us/project/enterprise-project-server.

(Continued)

*Primary Examiner* — Sana A Al-Hashemi
(74) *Attorney, Agent, or Firm* — Yee & Associates, P.C.

(57) ABSTRACT

A computer-implemented method for providing a modification history of digital information associated with a project is disclosed. A local agent runs at a computing entity at least temporarily associated with a user. A list of recognition tags is provided. A determination is made by the local agent whether digital information is associated with a project based on the list of recognition tags in order to establish project-relevant information. One or more additional recognition tags are automatically extracted out of the project-relevant information. The one or more additional recognition tags are added to the list of recognition tags. The project-relevant information or information derived from the project-relevant information is stored in a data repository. Modification history information is created regarding the project-relevant information.

20 Claims, 4 Drawing Sheets

(51) Int. Cl.
*G06F 16/21* (2019.01)
*G06F 16/23* (2019.01)

(58) Field of Classification Search
USPC ........ 707/609, 687, 705, 769, 790, 813, 821
See application file for complete search history.

(56) References Cited

U.S. PATENT DOCUMENTS

| | | |
|---|---|---|
| 8,738,414 B1 | 5/2014 | Nagar et al. |
| 8,935,334 B2 | 1/2015 | Hon |
| 9,003,368 B2 | 4/2015 | Kim et al. |
| 2003/0078826 A1 | 4/2003 | Swanke et al. |
| 2007/0074162 A1* | 3/2007 | Meijer ................. G06F 8/24 717/116 |
| 2011/0179045 A1 | 7/2011 | Caldwell et al. |
| 2011/0179049 A1 | 7/2011 | Caldwell et al. |
| 2012/0253875 A1* | 10/2012 | Harsh .............. G06Q 10/06395 705/7.15 |
| 2013/0179315 A1* | 7/2013 | Feliciano Lopez ...... G07C 1/06 705/32 |
| 2013/0238510 A1 | 9/2013 | Wieboldt |
| 2015/0100363 A1 | 4/2015 | Bishop |
| 2017/0123394 A1* | 5/2017 | Oliverio .............. G06F 15/7871 |
| 2017/0318091 A1* | 11/2017 | Ke ........................ H04L 67/327 |

OTHER PUBLICATIONS

Balestrazzi et al., "Managing Project Resources", filed May 17, 2017, U.S. Appl. No. 15/597,614, 34 pages.
List of IBM Patents Treated as Related, dated Nov. 16, 2017, 2 pages.
Notice of Allowance dated Nov. 4, 2021 regarding U.S. Appl. No. 15/597,614; 15 pages.

\* cited by examiner

MANAGING PROJECT RESOURCES

BACKGROUND

1. Field

The present invention relates generally to methods for managing project resources, and more particularly, to managing project resources based on dynamically determined keywords.

2. Description of the Related Art

In typical business environments, a team of people works on a project. Persons involved in the project collect and work on a plurality of digital resources like files, documents, web links, and mails. The resources constitute the framework of information required for project success. During the running project and after its termination, the problem arises that critical project information has to be available, preferably in an organized way, despite that they come from different origins and that they are of different type (files, documents, web links, mails, etc.). Specifically, during the runtime of a project, multiple decisions are made. In a later stage of the project or after finishing the project, the problem may arise that the reasons for making a certain decision have to be understood or reviewed. Therefore, not the final version of a certain digital resource may be of interest, but its changes during the project timeline in order to be able to understand at a later point of time why a certain decision was made.

SUMMARY

According to one illustrative embodiment, a computer-implemented method for providing a modification history of digital information associated with a project is provided. A local agent runs at a computing entity at least temporarily associated with a user. A list of recognition tags is provided. A determination is made by the local agent whether digital information is associated with a project based on the list of recognition tags in order to establish project-relevant information. One or more additional recognition tags are automatically extracted out of the project-relevant information. The one or more additional recognition tags are added to the list of recognition tags. The project-relevant information or information derived from the project-relevant information is stored in a data repository. A modification history information is created regarding the project-relevant information. According to other illustrative embodiments, a computer system and computer program product for providing a modification history of digital information associated with a project are provided.

DETAILED DESCRIPTION

Figure 1:
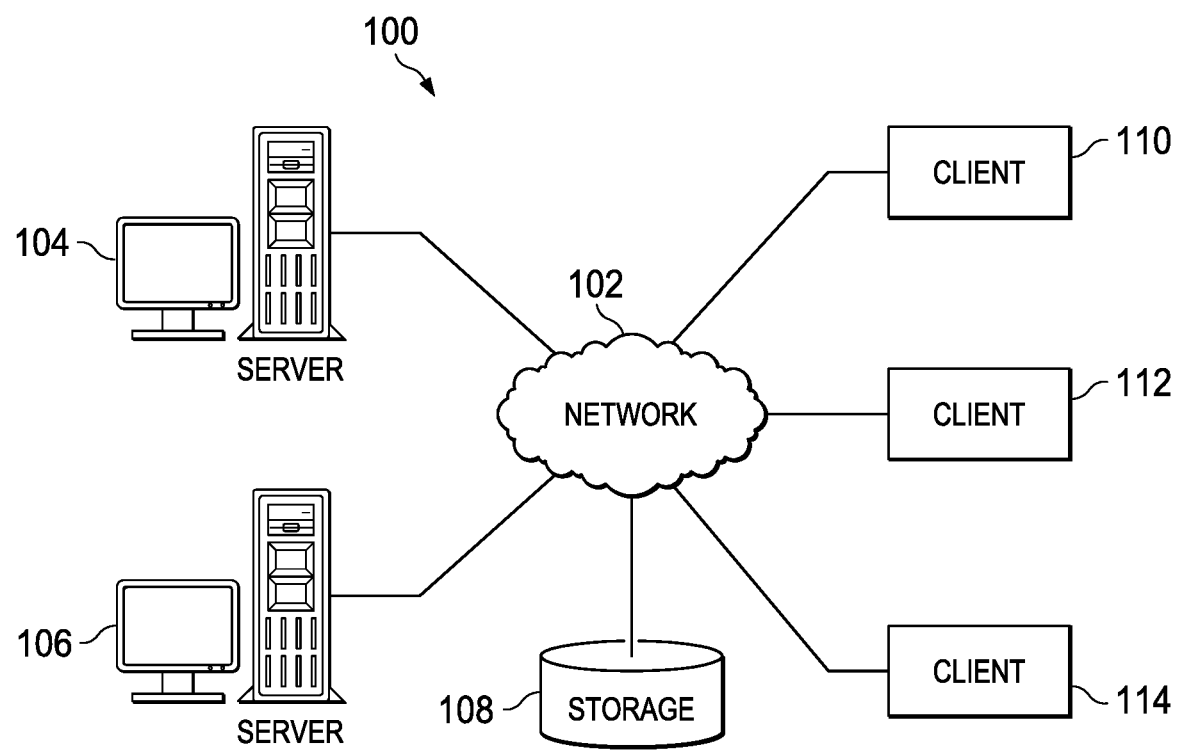
FIG. 1 is a pictorial representation of a network of data processing systems in which illustrative embodiments for providing a modification history of digital information may be implemented.

The term "local agent", as used in the present disclosure, may relate to any software application which can be used for filtering resources created or modified by a certain user in order to determine its project relevance.

The term "digital information" as used in the present disclosure shall mean information to be stored electronically in one or more databases, and shall include without limitation computer files, electronic documents, web links, electronic mail, text messages, graphics, animation, video presentations, audio and/or visual recordings of meetings and work sessions, teleconferencing, annotations, drafts, and revisions from digital resources used, created or modified by a user of the digital resources and filtered in real-time by a local agent in the user's computer in order to determine whether the created or modified digital resource is project-relevant so that it may be associated with a recognition tag and stored in a project database according to the recognition tag.

The term "recognition tag" as used in the present disclosure shall mean a document tag affixed to a digital resource identifying the digital resource as project relevant, determining where the digital resource will be stored in the project database, providing a keyword for searching. In addition, a recognition tag may indicate whether the digital resource shall be private or public. Initial recognition tags for a project may be created by a project administrator. Recognition tags may also be created by team members.

As used herein an "additional recognition tag" shall mean a recognition tag added by a team member who has analyzed a digital resource without a recognition tag and determined the digital resource is relevant to the project. An additional recognition tags may be added when analyzing a document already identified by one or more recognition tags determines that an additional recognition tag is necessary to reflect changes in digital resources and/or a project timeline. Additional recognition tags may also be added in order to reflect changes in project language.

In an illustrative example, members of team may have a need to understand a design choice for a project and why the design choice was made when the team members involved in the choice have been transferred and are no longer part of the project. In order to understand why the design choice was made, the current team members may not be interested in the final version of a document but in the changes made during the project timeline. In addition, the team members may desire to see all of the information related to that design choice including meetings held to discuss the design choice, the people involved in making the design choice, and/or other documents referencing the design choice. In the illustrative example, the documents have been processed at the time they were created or edited on the personal workstations of project team members at various points in a project timeline and not when the documents were placed into a repository. Therefore, the current team members may access particular information grouped around particular points in a team project timeline.

In an illustrative example, a user may be an architect who drafts on his personal workstation a document about 'web ui interface'. The user may be prompted to confirm that the document is of interest for the project. A local agent parses the document and identifies 'web us interface' as a recognition tag. Then from that time, every other document, mail, calendar entry and so on, in all the team member machines and for the duration of the project timeline, is monitored and documents are stored according to that recognition tag. Then people later working on the project may access all the information about the discussion of the topic, "web us interface," including individual contributions, and meeting minutes. In like manner, the exemplary process may be applied for other recognition tags dynamically computed in the project timeline.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing the particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
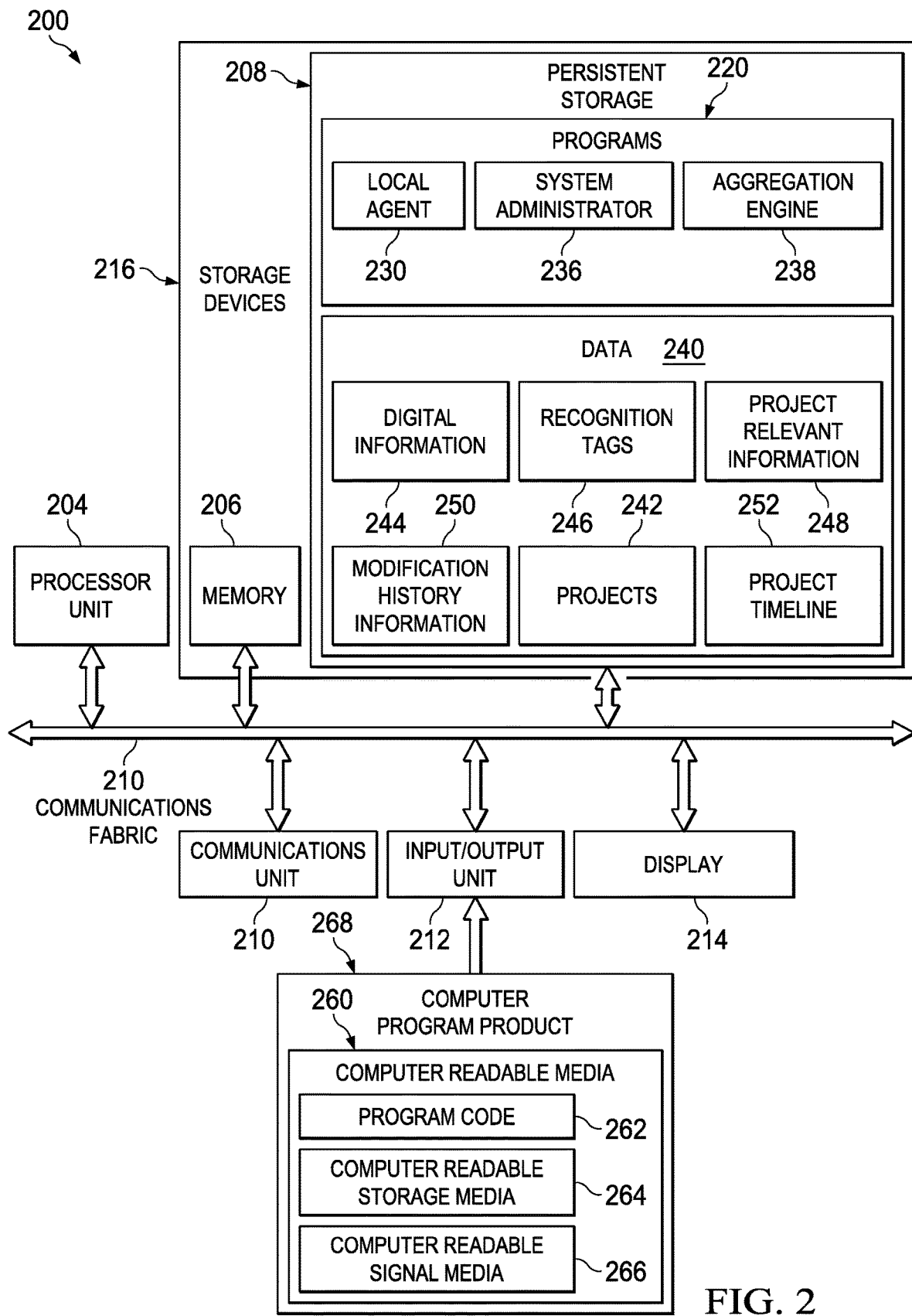
FIG. 2 is a diagram of a data processing system in which illustrative embodiments for providing a modification history of digital information may be implemented.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 is a pictorial representation of a network of data processing systems in which illustrative embodiments for providing a modification history of digital information may be implemented. FIG. 1 depicts a pictorial representation of a network of data processing systems in which an illustrative embodiment may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wired communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 or server 106 may, for example, manage recovery of a customer workload after failure of a primary computing environment executing the customer workload. The failed primary computing environment may be, for example, a server or a set of servers in a data center environment or a cloud environment. Server 104 or server 106 also may generate a secondary virtual machine seed image storage at a secondary data processing site for the failure recovery. The configuration of the secondary data processing site is similar to the configuration of the primary data processing site.

Client 110, client 112, and client 114 also connect to network 102. Clients 110, 112, and 114 are clients of server 104 and/or server 106. Server 104 and server 106 may provide information, such as boot files, operating system images, virtual machine images, and software applications to clients 110, 112, and 114.

In this example, clients 110, 112, and 114 may each represent a different computing environment. A computing environment includes physical and software resources used to execute a set of one or more customer workloads or tasks. A computing environment may comprise, for example, one server, a rack of servers, a cluster of servers, such as a data center, a cloud of computers, such as a private cloud, a public cloud, a hybrid cloud, or any combination thereof. In addition, each of clients 110, 112, and 114 may be a primary data processing site or a secondary data processing site. A primary data processing site initially executes a customer workload using a set of primary virtual machines and images. A secondary data processing site executes the customer workload using a set of secondary virtual machines and seed images when one or more primary virtual machines fail while processing the customer workload at the primary data processing site.

Storage 108 is a network storage device capable of storing any type of data in a structured format or an unstructured format. The type of data stored in storage 108 may be, for example, a list of computing environments with corresponding available resources, a list of primary data processing sites, a list of secondary data processing sites, a list of customer workloads, a plurality of virtual machine images, and the like. Further, storage 108 may store other types of data, such as authentication or credential data that may include user names, passwords, or biometric data associated with system administrators, for example.

In addition, it should be noted that network data processing system 100 may include any number of additional servers, clients, storage devices, and other devices not shown. Program code located in network data processing system 100 may be stored on a computer-readable storage medium and downloaded to a computer or other data processing device for use. For example, program code may be stored on a computer-readable storage medium on server 104 and downloaded to client 110 over network 102 for use by client 110.

In the depicted example, network data processing system 100 may be implemented as a number of different types of communication networks, such as, for example, an internet, an intranet, a local area network (LAN), or a wide area network (WAN). FIG. 1 is intended as an example only, and not as an architectural limitation for the different illustrative embodiments.

In an illustrative embodiment, network data processing system 100 may be a system for providing a modification history of digital information associated with a project. Network data processing system 100 may comprise multiple computing entities such as clients 110, 112, and 114. Clients 110, 112, and 114 may be for example, user workstations, at which certain users involved in a project are working on. Clients 110, 112, and 114 may be coupled via communication network 102.

Storage 108 may be a data repository. Specifically, storage 108 may be a data repository accessible by clients 110, 112, and 114. Storage 108 may be adapted to store information of the project triggered or initiated by clients 110, 112, and 114. Storage 108 may store information of a database which collects information regarding the project.

FIG. 2 is a diagram of a data processing system in which illustrative embodiments for providing a modification history of digital information may be implemented. With reference now to FIG. 2, a diagram of a data processing system is depicted in accordance with an illustrative embodiment. Data processing system 200 is an example of a computer, such as server 104 in FIG. 1, in which computer-readable program code or instructions implementing the processes of the illustrative embodiments may be located. In this illustrative example, data processing system 200 includes communications fabric 202, which provides communications between processor unit 204, memory 206, persistent storage 208, communications unit 210, input/output unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer-readable storage device is any piece of hardware that is capable of storing information, such as, for example, without limitation, data, computer-readable program code in functional form, and/or other suitable types of information, either on a transient basis and/or a persistent basis. Further, a computer-readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory drive, a rewritable optical disk, a rewritable magnetic tape, or some combination of the above. The media used by persistent storage 208 may be removable. For example, a removable hard drive may be used for persistent storage 208.

In this example, persistent storage 208 stores programs 220 and data 240. Programs 220 may include local agent 230, system administrator 236, and aggregation engine 238. Data 240 comprises projects 242, digital information 244, recognition tags 246, project relevant information 248, modification history information 250, and project timeline 252.

Local agent 230 is a piece of software configured to filter the digital resources created or modified by a certain user regarding their relevance for a certain project. Local agent 230 may be background software being started when booting the respective computing entity. Local agent 230 may scan digital resources created or modified by the respective user in real-time in order to determine whether the created or modified digital resource is project-relevant. Local agent 230 may automatically inspect the resources accessed by each team member. Local agent 230 may compare the resource attributes with those configured by the system administrator. Local agent 230 may be a daemon, a service or a plug-in running at the computing entity depending on the resources being inspected. At a configured interval, local agent 230 may save the resource relevant information into the system database. Depending on the configured criteria, local agent 230 may create a copy of the resource into the shared repository. Depending on the configured criteria, local agent 230 may query a user for a confirmation prior to sharing the resource. Information may be either shared information or private information. A shared information will be accessed by all team members, while a private information can be accessed only by specified team members.

Before performing the filtering/scanning tasks, network data processing system 100 may be configured by a respective system administrator such as system administrator 236. The system may provide an administrative interface for configuring the system. During a configuration routine, system administrator 236 may create a new project and define project parameters for the project. More in detail, the project parameters may include information regarding the project schedule, e.g. start date, end date, project milestones etc. In addition, system administrator 236 may identify and configure the digital resources which should be taken into account (e.g. files, documents, websites, links, mails, technical draws etc.). Thereby, the scope of digital resources relevant for the respective project can be limited. Furthermore, system administrator 236 may define which users are project members. Thus, for a certain project, only digital information created or modified by these project members are taken into account by local agents.

Furthermore, during the configuration routine, system administrator 236 may configure one or more recognition tags based on which the local agent is able to automatically determine whether certain digital information is project-relevant or not. The recognition tags may be, for example, keywords, file names, parts of file names, or any other indicator based on which it is possible to select or filter digital information regarding its project-relevance. The local agent may be adapted to determine project relevant digital information based on a list of recognition tags which include the recognition tags configured by the system administrator.

In addition, a consolidation period may be configured by the system administrator. The consolidation period may be a period of time. After the expiry of the consolidation period, the digital information determined as being project-relevant is analyzed and consolidated into the shared data repository. In addition, criteria for performing the consolidation of digital information may be defined by the system administrator.

After configuration of the project resource management system, the local agents installed at the computing entities may monitor digital resources which match to the configured information types (e.g. files, documents, websites, links, mails, technical draws etc.), are created or modified by a project member and contain one or more defined recognition tags. The monitoring may be performed in the background without any user interaction. Thereby, a user friendly filtering of project-relevant information is obtained.

Aggregation engine 238 may perform data processing and/or data aggregation tasks in order to establish data regarding the modification history of project relevant digital resources. Once relevant information is added to the database, aggregation engine 238 performs all aggregations and consolidations that have been configured. Specifically, aggregation engine 238 aggregates the private information by team member (user), aggregates the information in a hierarchy by the provided "tags" such as project, area, sub-area, and updates resources that are already present in the database each time they are accessed or modified within the project boundaries, and records the change history of the resources stored in the database.

Projects 242 are projects suitable for proactive project resources management. Projects 242 will be the projects for which local agent 230 runs in the background of the computing entity and collects digital information 244. Digital information 244 may be any unfiltered information related to projects 242 from which project relevant information, such as project relevant information 248 may be extracted. Recognition tags 246 are tags configured by system administrator 236, and allow local agent 230 to automatically determine whether certain digital information is project-relevant or not. Illustrative examples of recognition tags 246 may be keywords, file names, parts of file names, or any other indicator based on which it is possible to select or filter digital information regarding its project-relevance. Project relevant information 248 may be identified based on a list of recognition tags that enable local agent to determine whether certain digital information is associated with a project. Thereby, project-relevant information can be established. After determining that certain digital information is project-relevant, one or more further recognition tags may be automatically extracted out of the project-relevant information and the further extracted recognition tags may be added to the list of recognition tags, in order to increase the data base in which project-relevant digital information is found.

Modification history information 250 may be information regarding the user responsible for creating or changing the digital information, the point of time of creating/changing the digital information, the access of users to certain digital information, the access type (read/write), the resource access rate. Preferably, the aggregation engine may also record information regarding successive modifications made at certain kinds of digital information, e.g. a document. Project timeline 252 may be a timeline for one or more of projects 242. According to an illustrative embodiment, a determination may be made whether certain digital information is associated with a project is performed in real-time or quasi-real-time so that it the generation and/or modification of project-relevant digital information may be tracked immediately in order to provide substantiated information regarding project development over a project timeline, such as project timeline 252.

Communications unit 210, in this example, provides for communication with other computers, data processing systems, or devices via a network, such as network 102 in FIG. 1. Communications unit 210 may provide communications through the use of, both physical and wireless, communications links. The physical communications link may utilize, for example, a wire, a cable, a universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer-usable program code, or computer-readable program code that may be read and run by a processor in processor unit 204. The program instructions in the different embodiments may be embodied on different physical computer-readable storage devices, such as memory 206 or persistent storage 208.

Program code 242 is located in a functional form on computer-readable media 260 that is selectively removable and may be loaded onto or transferred to data processing system 200 for running by processor unit 204. Program code 242 and computer-readable media 244 form computer program product 268. In one example, computer-readable media 244 may be computer-readable storage media 252 or computer-readable signal media 266. Computer-readable storage media 264 may include, for example, an optical or magnetic disc that is inserted or placed into a drive or other device that is part of persistent storage 208 for transfer onto a storage device, such as a hard drive, that is part of persistent storage 208. Computer-readable storage media 264 also may take the form of a persistent storage, such as a hard drive, a thumb drive, or a flash memory that is connected to data processing system 200. In some instances, computer-readable storage media 264 may not be removable from data processing system 200.

Alternatively, program code 242 may be transferred to data processing system 200 using computer-readable signal media 266. Computer-readable signal media 266 may be, for example, a propagated data signal containing program code 242. For example, computer-readable signal media 266 may be an electromagnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 242 may be downloaded over a network to persistent storage 208 from another device or data processing system through computer-readable signal media 266 for use within data processing system 200. For instance, program code stored in a computer-readable storage media, such as computer-readable storage media 252, in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components, in addition to or in place of, those illustrated for data processing system 200. Other components shown in FIG. 2 can be varied from the illustrative examples shown. The different embodiments may be implemented using any hardware device or system capable of executing program code 242. As one example, data processing system 200 may include organic components integrated with inorganic components and/or may be comprised entirely of organic components, excluding a human being. For example, a storage device may be comprised of an organic semiconductor.

As another example, a computer-readable storage device in data processing system 200 is any hardware apparatus that may store data. Memory 206, persistent storage 208, and computer-readable storage media 264 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as a cache found in an interface and memory controller hub that may be present in communications fabric 202.

It is understood that the illustrative embodiments are capable of being implemented in conjunction with any other type of computing environment now known or later developed.

Figure 3:
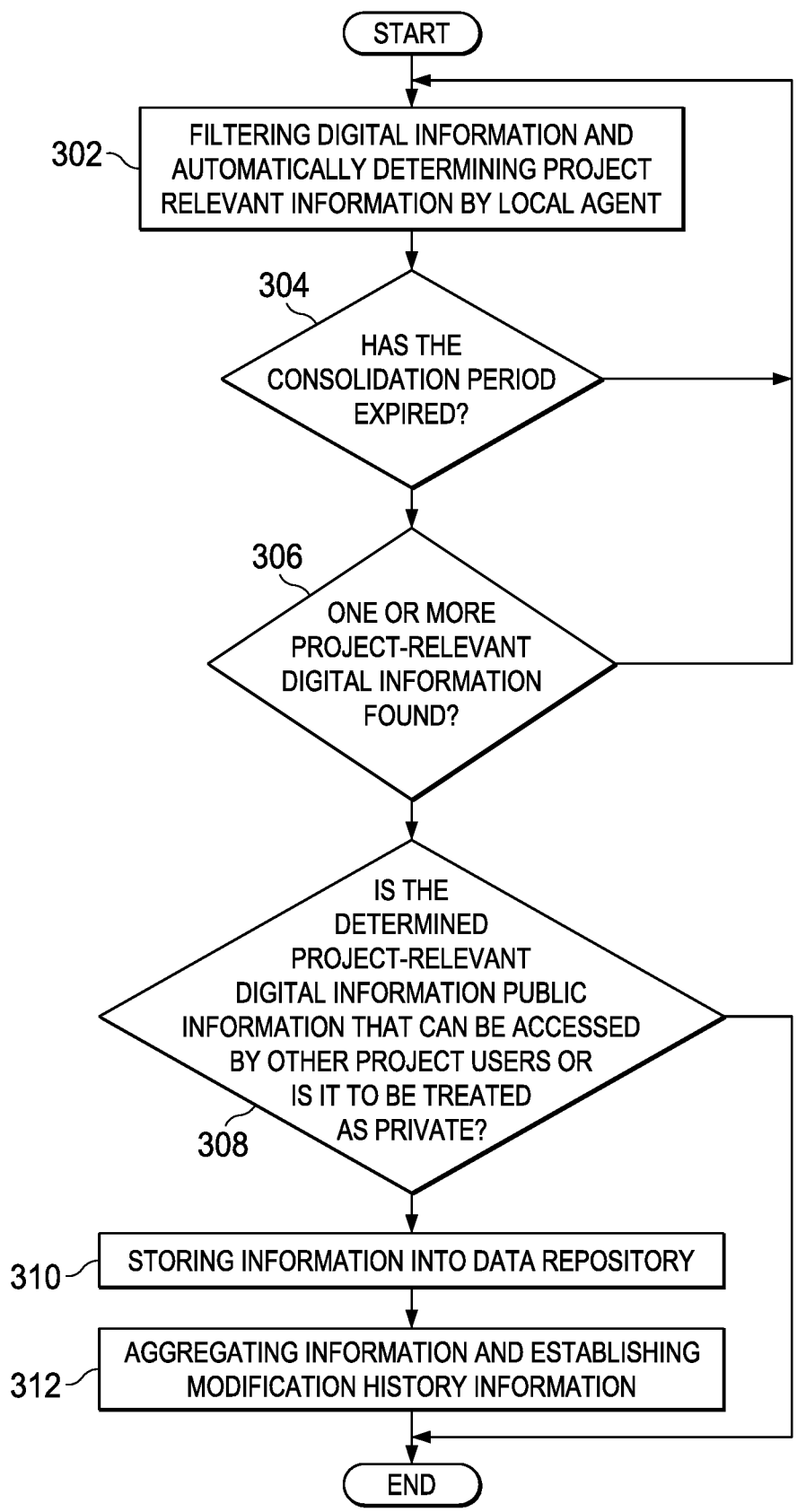
FIG. 3 is a flowchart illustrating a process for aggregating information and for providing a modification history of digital information in accordance with an illustrative embodiment.

FIG. 3 is a flowchart illustrating a process for aggregating information and for providing a modification history of digital information in accordance with an illustrative embodiment. First, the local agent filters digital information and automatically determines project-relevant information (Step 302). In an illustrative embodiment, the local agent may be local agent 230 in FIG. 2. For example, digital information classified by the local agent as project-relevant is temporarily stored by the computing entity, for example, the user workstation. Preferably, the local agent is adapted to provide a list to the respective user in order to confirm that digital information automatically classified as being project-relevant by the local agent (classification by software) is indeed project-relevant (double-check by user). In the following, the local agent determines whether the consolidation period (time period) has expired (Step 304). If not, the local agent proceeds in filtering digital information. If the consolidation period has expired, the local agent checks whether one or more project-relevant digital information has been found (Step 306). If not, the local agent proceeds in filtering digital information for the next consolidation period. If one or more project-relevant digital information has been found, the user is prompted to determine whether the determined project-relevant digital information is public information and can therefore be accessed by other project users or the digital information should be treated as private (Step 308). Thus, each digital information is associated with a flag indicating the information as public or private.

The local agent may be adapted to automatically refine the list of recognition tags based on the new digital information determined as being project-relevant. More in detail, the local agent is configured to search for new recognition tags within the new project-relevant digital information and add the new recognition tags to the list of recognition tags. Therefore, the list of keywords is not static (as configured by the system administrator) but is refined successively. After adding new recognition tags, digital information is classified as project-relevant also based on the newly added recognition tags Afterwards, project-relevant digital information, specifically digital information also verified by the user as being project-relevant is stored in the data repository (Step 310). Depending on the flag determining the sharing policy (private/public), the respective digital information can be accessed by all members of the project or only by the respective user which created/modified the digital information. The storing step may comprise storing a copy of the project-relevant digital information or only a link to the original information which may be stored at the user's computing entity or a storage device accessible by the user's computing entity.

Finally, the aggregation engine may aggregate and/or consolidate the project-relevant information according to the given configuration (established by the system administrator) and establish modification history information (Step 312). In an illustrative embodiment, the aggregation engine may be aggregation engine 238 in FIG. 2. In an illustrative embodiment, the modification history information may be modification history information 250 in FIG. 2. In general, the aggregation engine provides condensed information regarding digital information associated with a certain project in order to be able to reproduce the project development and/or decisions made during the project runtime at a later point of time.

More in detail, the aggregation engine may aggregate or compose digital information classified as being relevant for a certain project according to certain aggregation characteristics. For example, the aggregation engine may aggregate digital information labeled as "private" by the respective user, i.e. all private digital information of a certain user is bundled. In addition, the aggregation engine may aggregate digital information according to a certain hierarchy, the hierarchy being given by predefined tags (e.g. predefined during project configuration). For example, digital information is aggregated according to tags like "project", "area", "sub-area" etc. In addition, in case that a copy (e.g. one-to-one copy) of digital information is stored in the data repository, the aggregation engine may update the digital information each time it is accessed/modified given that the boundaries defined during the configuration routine are fulfilled.

Furthermore, the aggregation engine may record a modification history of digital information stored in the data repository. More in detail, the aggregation engine may record one or more of the following information: information regarding the user responsible for creating or changing the digital information, the point of time of creating/changing the digital information, the access of users to certain digital information, the access type (read/write), the resource access rate. Preferably, the aggregation engine may also record information regarding successive modifications made at certain digital information, e.g. a document. Each modification may be associated with time information, the time information indicating when a certain modification has been made. Thereby, consecutive modifications of a document are recorded/logged. Thereby, it is possible to determine at a later point of time how certain digital information have been modified and who is responsible for the modifications.

Within the data repository, a database is kept. The database may store information as indicated above. Specifically, the database may include the following items: resource name and optionally resource type (e.g. file name, file type, link, shared repository), resource location and permission (e.g. user, computer or share point, flag indicating private or shared information), historical data (resource access date/time, user performing access, access type (read/write), resource access rate) and optionally content (one-to-one copy instead of reference/link).

Figure 4:
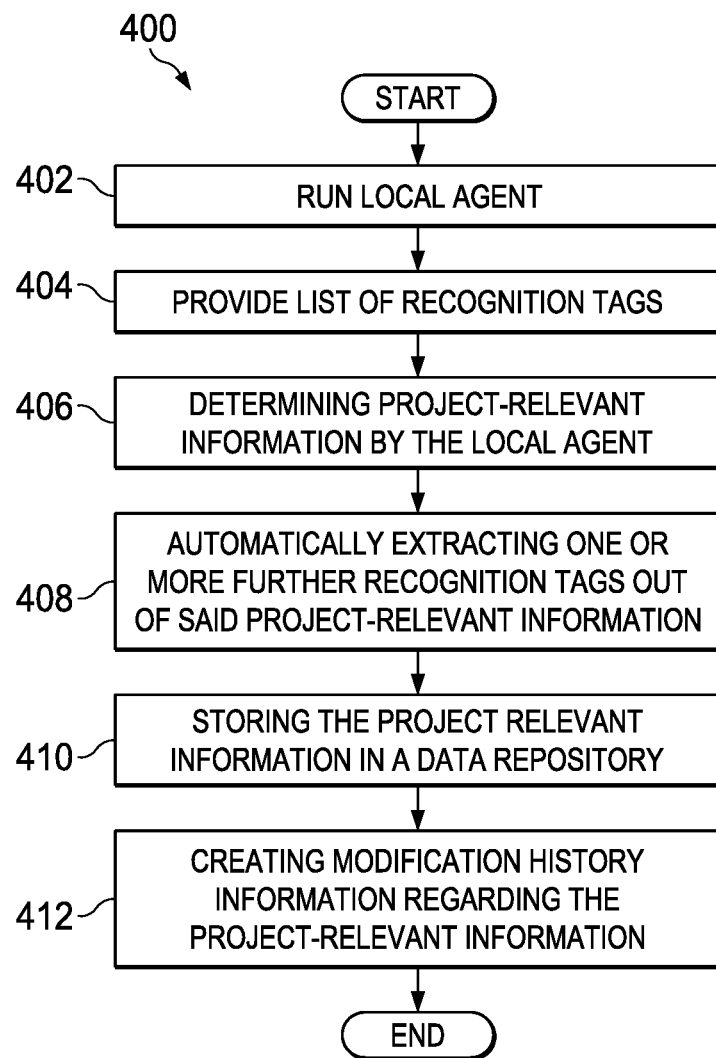
FIG. 4 is a flowchart illustrating a process for providing a modification history of digital information in accordance with an illustrative embodiment.

FIG. 4 is a flowchart illustrating a process for providing a modification history of digital information in accordance with an illustrative embodiment. First, a local agent is started/run at a computing entity (Step 402). The local agent runs in the background of the computing entity and is adapted to collect digital information which are related to one or more projects. Preferably, the local agent is not a piece of software which has to be started manually, but the local agent is started automatically, e.g. during the start routine of the computing entity.

In addition, a list of recognition tags is provided (Step 404). The list of recognition tags includes certain features (e.g. key words etc.) which can be used for checking whether certain digital information refers to a certain project.

Based on the list of recognition tags it is possible to determine by the local agent whether certain digital information is associated with a project (Step 406). Thereby, project-relevant information can be established. After determining that certain digital information is project-relevant, one or more further recognition tags are automatically extracted out of the project-relevant information (Step 408). The further extracted recognition tags are added to the list of recognition tags, in order to increase the data basis based in which project-relevant digital information is found.

The project-relevant digital information or information derived from the project-relevant information is stored in a data repository (Step 410). For example, a one-to-one copy of the digital information is stored or only a link or file name/file path is stored. In addition, modification history information regarding the project-relevant information is created (Step 412).

Summing up, a method for providing a modification history of digital information has been presented. The method is advantageous because based on the information gathered by the inventive method it is possible to track the generation and modification of digital information which is used by a project team during the project runtime and reconstruct the project timeline. Thereby, at a later point of time it is, for example, possible to reproduce why a certain decision or design choice was chosen.

According to an illustrative embodiment, the local agent is a piece of software running in the background of the computing entity. Preferably, the user does not have to start a certain application manually but the local agent is automatically started and running in the background. Thereby, the usability and hit rate of the method is significantly increased.

According to an illustrative embodiment, the local agent is a daemon, plugin or service which is automatically started when booting the operating system of the computing entity. Thus, the user does not have to care about starting a certain application for gathering project information, but the local agent is running every time, the user works at the computing entity.

According to an illustrative embodiment, the list of recognition tags is created during a configuration routine defining project details. For example, the system administrator may predefine certain keywords based on which digital information is classified as being project-relevant.

According to an example embodiment, during a configuration routine defining project details, users associated with the project, resource types (files, mail, web etc.) to be taken into account and/or project schedule information (e.g. start time, end time, mile stones etc.) are specified. Thereby, it is possible to define a frame (which user workstations have to be monitored, which data are of interest etc.) based on which it is possible to filter out project-relevant information.

According to an illustrative embodiment, the step of determining whether certain digital information is associated with a project is performed in real-time or quasi-real-time. Thereby it is possible to track the generation and/or modification of project-relevant digital information immediately in order to provide substantiated information regarding project development over the project timeline.

According to an illustrative embodiment, the step of determining whether certain digital information is associated with a project comprises analyzing resources created or modified by a user and identifying based on the list of recognition tags if the resource is related to the project. Thus, the recognition tags are used as indicators for determining the project-relevance of certain digital information.

According to an illustrative embodiment, before storing the project-relevant information or information derived from the project-relevant information, the information is associated with information indicating whether the information is private information or can be shared among other users working on the project. Thereby, a certain user can review information indicated by the local agent as being project-relevant and decide whether the information can be shared or should remain private.

According to an illustrative embodiment, the established project-relevant information is verified by the user as being project-relevant. So, in other words, the computing entity may prompt the user to review digital information being classified by the local agent as project-relevant and confirm the project-relevance. Thereby, digital information being incorrectly classified as project-relevant can be avoided.

According to an illustrative embodiment, the storing in the data repository is performed after expiry of a predefined consolidation period. During the consolidation period, the aggregation engine can perform data aggregation and the local agents automatically collect project-relevant information. After expiry of the consolidation period, the storing of project-relevant information (e.g. after confirmation and classification as private/public) is performed.

According to an illustrative embodiment, after storing the project-relevant information or information derived from the project-relevant information in the data repository, an aggregation engine aggregates the information according to the respective user and/or according to predefined project structure information (mile stones, area, subarea etc.). By means of the data aggregation, a structured data base is created which simplifies a later search for certain project details in order to, for example, find out why a certain decision within the project has been taken.

According to an illustrative embodiment, after storing the project-relevant information or information derived from the project-relevant information in the data repository, an aggregation engine updates information already included in the data repository based on new project-relevant information and/or records the history of changes of information stored in the data repository. So, in other words, the aggregation engine performs data processing in order to prepare the gathered information for presenting the development of digital resources during the project lifetime.

According to an illustrative embodiment, the step of creating modification history information includes storing information regarding the modification of the project-relevant information together with the user performing the modification and/or the point of time of the modification. Thereby it is possible to track the development of digital resources over project lifetime.

According to an illustrative embodiment, the step of creating modification history information includes storing information regarding the access type and/or the resource access rate. Thereby it is also possible to determine which digital information has been used most in a certain project time period.

A computer-implemented method for providing a modification history of digital information associated with a project is disclosed. A local agent runs at a computing entity at least temporarily associated with a user. A list of recognition tags is provided. A determination is made by the local agent whether digital information is associated with a project based on the list of recognition tags in order to establish project-relevant information. One or more additional recognition tags are automatically extracted out of the project-relevant information. The one or more additional recognition tags are added to the list of recognition tags. The project-relevant information or information derived from the project-relevant information is stored in a data repository. A modification history information is created regarding the project-relevant information.

A system for providing a modification history of digital information associated with a project comprises a plurality of computing entities at least temporarily associated with certain users, a data repository and an aggregation engine. The computing entities are adapted to run local agents configured to determine whether a certain digital information is associated with a project based on a list of recognition tags, thereby establishing project-relevant information; to automatically extract one or more further recognition tags out of the project-relevant information and adding the further recognition tags to the list of recognition tags; to initiate the storage of the project-relevant information or information derived from the project-relevant information in the data repository. The aggregation engine is configured to create modification history information regarding the project-relevant information.

A computer program product for providing a modification history of digital information associated with a project comprises a computer-readable storage medium having program instructions embodied therewith, the program instructions executable by a processor to cause the processor to execute a method according to the above-mentioned aspects.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed herein.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, or combinations of blocks in the block diagrams and/or flowchart illustrations, can be implemented by special purpose hardware-based systems that perform the specified functions or acts, or combinations of special purpose hardware and computer instructions.

What is claimed is:

1. A computer program product for providing a modification history of digital information associated with a project, the computer program product comprising instructions written on a computer readable media and executable by a computer to perform steps of:
   running a local agent at a computing entity at least temporarily associated with a user;
   providing a list of recognition tags;
   determining by the local agent whether a certain digital information is associated with a project based on the list of recognition tags, thereby establishing project-relevant information by analyzing resources created or modified by a user and identifying, based on the list of recognition tags, whether the resource is related to the project;
   automatically extracting one or more further recognition tags out of the project-relevant information and adding the further recognition tags to the list of recognition tags;
   storing the project-relevant information or information derived from the project-relevant information in a data repository; and
   creating modification history information regarding the project-relevant information.

2. The computer program product of claim 1, wherein the local agent comprises a piece of software running in a background of the computing entity.

3. The computer program product of claim 1, wherein the local agent comprises a daemon, plugin or service which automatically starts when an operating system of the computing entity is booted.

4. The computer program product of claim 1, wherein the list of recognition tags is created during a configuration routine defining project details.

5. The computer program product of claim 1, wherein determining whether certain digital information is associated with a project is performed in a real-time or a quasi-real-time.

6. The computer program product of claim 1, wherein before storing the project-relevant information or information derived from the project-relevant information, the project-relevant information is associated with information indicating whether the project-relevant information is private information or can be shared among other users working on the project.

7. The computer program product of claim 1, wherein the established project-relevant information is verified by the user as project-relevant.

8. The computer program product of claim 1, wherein the storing in the data repository is performed after expiring of a predefined consolidation period.

9. The computer program product of claim 1, wherein after storing the project-relevant information or information derived from the project-relevant information in the data repository, an aggregation engine aggregates the project-relevant information according to the respective user and according to predefined project structure information.

10. The computer program product of claim 1, wherein after storing the project-relevant information or information derived from the project-relevant information in the data repository, an aggregation engine updates information already included in the data repository based on new project-relevant information and/or records a history of changes of information stored in the data repository.

11. The computer program product of claim 1, wherein the step of creating modification history information includes storing information regarding the modification of the project-relevant information together with the user performing the modification and/or a point of time of the modification.

12. The computer program product of claim 1, wherein the step of creating modification history information includes storing information regarding one of an access type and a resource access rate.

13. The computer program product of claim 1, wherein each of the recognition tags is a tag affixed to a given resource of the resources that identifies the given resource as being related to the project, and provides a keyword for searching.

14. The computer program product of claim 2, wherein the local agent filters the resources created or modified by the user regarding a relevance of the created or modified resources for the project.

15. The computer program product of claim 4, wherein, the configuration routine comprises defining project details, specifying users associated with the project, specifying resource types to be taken into account and specifying project schedule information.

16. The computer program product of claim 13, wherein each of the recognition tags determines where the given resource will be stored in the data repository.

17. The computer program product of claim 13, wherein the aggregation engine is further configured to aggregate the project-relevant information in the data repository according to a given configuration.

18. The computer program product of claim 14, wherein an aggregation engine creates the modification history information regarding the project-relevant information for the resources filtered by the local agent.

19. The computer program product of claim 17, wherein the modification history comprises user information regarding a user responsible for creating or changing the project-relevant information and a point in time the user created or changed the project-relevant information.

20. The computer program product of claim 19, and wherein the modification history comprises information regarding successive modifications made to certain of the project-relevant information.

* * * * *